United States Patent
Gan et al.

(10) Patent No.: US 11,991,603 B2
(45) Date of Patent: May 21, 2024

(54) METHODS AND APPARATUSES FOR FACILITATING ROAMING OF TERMINAL DEVICE

(71) Applicant: Telefonaktiebolaget LM Ericsson (PUBL), Stockholm (SE)

(72) Inventors: Juying Gan, Shanghai (CN); Qian Chen, Mölndal (SE); Stefan Rommer, Västra Frölunda (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 423 days.

(21) Appl. No.: 17/420,764

(22) PCT Filed: Jan. 9, 2020

(86) PCT No.: PCT/CN2020/071198
§ 371 (c)(1),
(2) Date: Jul. 6, 2021

(87) PCT Pub. No.: WO2020/143716
PCT Pub. Date: Jul. 16, 2020

(65) Prior Publication Data
US 2022/0116753 A1    Apr. 14, 2022

(30) Foreign Application Priority Data
Jan. 10, 2019  (WO) ................ PCT/CN2019/071234

(51) Int. Cl.
*H04W 76/12*  (2018.01)
*H04M 15/00*  (2006.01)
(Continued)

(52) U.S. Cl.
CPC ............. *H04W 4/24* (2013.01); *H04M 15/66* (2013.01); *H04M 15/8016* (2013.01);
(Continued)

(58) Field of Classification Search
CPC ... H04W 4/24; H04W 28/0268; H04M 15/66; H04M 15/8016; H04M 15/8038;
(Continued)

(56) References Cited

U.S. PATENT DOCUMENTS

2014/0036785 A1    2/2014  Li et al.
2020/0163134 A1*   5/2020  Ying ..................... H04W 76/27

FOREIGN PATENT DOCUMENTS

EP    2 624 607 A1    8/2013
WO   2013 056368 A1   4/2013
WO   WO-2014033534 A2 *  3/2014  ......... H04L 12/1403

OTHER PUBLICATIONS

3GPP TS 23.502 version 15.2.0 Release 15; ETSI TS 123 502 V15.2.0 (Jun. 2018) (Year: 2018).*
(Continued)

*Primary Examiner* — Lan-Huong Truong
(74) *Attorney, Agent, or Firm* — Weisberg I.P. Law, P.A.

(57) ABSTRACT

Methods and apparatuses are disclosed for facilitating roaming of terminal device. According to an embodiment, a session management node operable in a home network receives, from another session management node operable in a visiting network, a quality of service (QoS) policy per a roaming agreement between the visiting network and the home network during establishment of a protocol data unit (PDU) session for a terminal device. The session management node retrieves, from a subscriber management node, subscribed QoS parameters of the terminal device. The session management node obtains a result that is generated based on the QoS policy per the roaming agreement and the subscribed QoS parameters of the terminal device.

11 Claims, 8 Drawing Sheets

(51) Int. Cl.
  *H04W 4/24* (2018.01)
  *H04W 28/02* (2009.01)
(52) U.S. Cl.
  CPC ... *H04M 15/8038* (2013.01); *H04M 15/8228* (2013.01); *H04W 28/0268* (2013.01)
(58) Field of Classification Search
  CPC .. H04M 15/8228; H04M 15/00; H04M 15/80; H04L 12/14; H04L 12/1407
  See application file for complete search history.

(56) References Cited

OTHER PUBLICATIONS

SA WG2 Meeting #122bis; Sophia Antipolis, France; Source: CATT; Title: 23.502: Update PDU Session Establishment flow for QoS-related subscription data (S2-176492)—Aug. 21-25, 2017 (Year: 2017).*

EPO Communication with Supplementary European Search Report dated Aug. 23, 2022 for Patent Application No. 20738610.3, consisting of 12—pages.
3GPP TSG SA WG5 (Telecom Management) Meeting #120 S5-185384 revision of S5-185225; Title: pCR TS 32.255 Clarification on Roaming flows description; Agenda Item: 7.4.1; Source: Nokia, Nokia Shanghai Bell; Document for: Approval; Date and Location: Aug. 20-24, 2018, Belgrade (Serbia), consisting of 7—pages.
PCT Notification of Transmittal of the International Search Report and the Written Opinion of the International Searching Authority, or the Declaration issued for International application No. PCT/CN2020/071198—dated Apr. 9, 2020.
SA WG2 Meeting #122bis; Sophia Antipolis, France; Source: CATT; Title: 23.502: Update PDU Session Establishment flow for QoS-related subscription data (S2-176492)—Aug. 21-25, 2017.
PCT International Search Report issued for International application No. PCT/CN2020/071198—dated Apr. 9, 2020.
PCT Written Opinion of the International Searching Authority issued for International application No. PCT/CN2020/071198—dated Apr. 9, 2020.

* cited by examiner

METHODS AND APPARATUSES FOR FACILITATING ROAMING OF TERMINAL DEVICE

PRIORITY

This nonprovisional application is a U.S. National Stage Filing under 35 U.S.C. § 371 of International Patent Application Serial No. PCT/CN2020/071198 filed Jan. 9, 2020 and entitled "Methods and Apparatuses for Facilitating Roaming of Terminal Device" which claims priority to International Patent Application Serial No. PCT/CN2019/071234 filed Jan. 10, 2019 both of which are hereby incorporated by reference in their entirety.

TECHNICAL FIELD

Embodiments of the disclosure generally relate to communication, and, more particularly, to methods and apparatuses for facilitating roaming of terminal device.

BACKGROUND

This section introduces aspects that may facilitate better understanding of the present disclosure. Accordingly, the statements of this section are to be read in this light and are not to be understood as admissions about what is in the prior art or what is not in the prior art.

According to clause 5.7.2.7 of the 3rd generation partnership project (3GPP) technical specification (TS) 23.501 v15.3.0, during protocol data unit (PDU) session establishment, a session management function (SMF) retrieves subscribed quality of service (QoS) from a unified data management (UDM). The subscribed QoS may be modified by the SMF based on local policy or based on interaction with a policy control function (PCF).

The subscribed QoS is part of the subscription data retrieved from the UDM by the SMF. According to Table 5.2.3.3.1-1 of 3GPP TS 23.502 v15.3.0, the subscription data contains one or more single network slice selection assistance information (S-NSSAI) level subscription data. An S-NSSAI level subscription data may contain the value of the S-NSSAI and a list of subscribed data network names (DNNs) for the S-NSSAI. For each DNN, the S-NSSAI level subscription data may contain the 5th generation (5G) system (5GS) subscribed QoS profile and subscribed session aggregated maximum bit rate (AMBR). The 5GS subscribed QoS profile refers to the QoS flow level QoS parameter values (5G QoS indicator (5QI) and allocation/retention priority (ARP)) for the DNN, S-NSSAI. The subscribed session AMBR refers to the maximum aggregated uplink and downlink maximum bit rates (MBRs) to be shared across all non-guaranteed bit rate (non-GBR) QoS flows in each PDU session, which are established for the DNN, S-NSSAI.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for facilitating roaming of terminal device.

According to a first aspect of the disclosure, there is provided a method implemented at a session management node operable in a visiting network. The method may comprise sending, to another session management node operable in a home network, a QoS policy per a roaming agreement between the visiting network and the home network during establishment of a PDU session for a terminal device.

In an embodiment of the disclosure, the terminal device may be registered in the home network and roaming in the visiting network in home routed roaming manner.

In an embodiment of the disclosure, the QoS policy per the roaming agreement may comprise one or more QoS parameters allowed in the visiting network.

In an embodiment of the disclosure, the QoS policy per the roaming agreement may be sent in a request for creating a PDU session for the terminal device.

According to a second aspect of the disclosure, there is provided a method implemented at a session management node operable in a home network. The method may comprise receiving, from another session management node operable in a visiting network, a QoS policy per a roaming agreement between the visiting network and the home network during establishment of a PDU session for a terminal device. The method may further comprise retrieving, from a subscriber management node, subscribed QoS parameters of the terminal device. The method may further comprise obtaining a result that is generated based on the QoS policy per the roaming agreement and the subscribed QoS parameters of the terminal device.

In an embodiment of the disclosure, obtaining the result may comprise determining the result by the session management node.

In an embodiment of the disclosure, determining the result by the session management node may comprise determining whether the subscribed QoS parameters are compliant with the QoS policy. Determining the result by the session management node may further comprise, when determining that at least one QoS parameter of the subscribed QoS parameters is not compliant with the QoS policy, modifying the at least one QoS parameter such that the modified at least one QoS parameter is compliant with the QoS policy.

In an embodiment of the disclosure, obtaining the result may comprise sending the QoS policy per the roaming agreement and the subscribed QoS parameters of the terminal device to a policy control node operable in the home network. Obtaining the result may further comprise receiving the result from the policy control node.

In an embodiment of the disclosure, the QoS policy per the roaming agreement may comprise one or more QoS parameters allowed in the visiting network.

In an embodiment of the disclosure, the QoS policy per the roaming agreement may be received in a request for creating a PDU session for the terminal device.

According to a third aspect of the disclosure, there is provided a method implemented at a policy control node operable in a home network. The method may comprise receiving, from a session management node operable in the home network, a QoS policy per a roaming agreement between a visiting network and the home network and subscribed QoS parameters of a terminal device. The method may further comprise determining a result based on the QoS policy per the roaming agreement and the subscribed QoS parameters of the terminal device. The method may further comprise sending the determined result to the session management node.

In an embodiment of the disclosure, determining the result may comprise determining whether the subscribed QoS parameters are compliant with the QoS policy. Determining the result may further comprise, when determining that at least one QoS parameter of the subscribed QoS parameters is not compliant with the QoS policy, modifying the at least one QoS parameter such that the modified at least one QoS parameter is compliant with the QoS policy.

In an embodiment of the disclosure, the QoS policy per the roaming agreement may comprise one or more QoS parameters allowed in the visiting network.

According to a fourth aspect of the disclosure, there is provided a method implemented at a session management node operable in a visiting network. The method may comprise obtaining, from another session management node operable in a home network, QoS parameters authorized by the home network, during establishment of a PDU session for a terminal device. The method further comprises determining a result based on a QoS policy per a roaming agreement between the visiting network and the home network and the QoS parameters authorized by the home network.

In an embodiment of the disclosure, determining the result may comprise determining whether the QoS parameters authorized by the home network are compliant with the QoS policy. Determining the result may further comprise, when determining that at least one QoS parameter of the QoS parameters authorized by the home network is not compliant with the QoS policy, modifying the at least one QoS parameter such that the modified at least one QoS parameter is compliant with the QoS policy.

In an embodiment of the disclosure, the method may further comprise sending the modified at least one QoS parameter to the terminal device, a base station serving the terminal device, and a user plane node operable in the visiting network.

In an embodiment of the disclosure, the method may further comprise determining which QoS parameter(s) of the modified at least one QoS parameter are to be sent to the another session management node, based on the QoS policy per the roaming agreement. The method may further comprise sending the determined QoS parameter(s) to the another session management node.

In an embodiment of the disclosure, the determined QoS parameter(s) may be sent in a request for updating the PDU session for the terminal device.

In an embodiment of the disclosure, obtaining the QoS parameters authorized by the home network may comprise sending, to the another session management node, a request for creating a PDU session for the terminal device. Obtaining the QoS parameters authorized by the home network may further comprise receiving, from the another session management node, a response that contains the QoS parameters authorized by the home network.

According to a fifth aspect of the disclosure, there is provided a session management node operable in a visiting network. The session management node may comprise at least one processor and at least one memory. The at least one memory may contain instructions executable by the at least one processor, whereby the session management node may be operative to send, to another session management node operable in a home network, a QoS policy per a roaming agreement between the visiting network and the home network during establishment of a PDU session for a terminal device.

In an embodiment of the disclosure, the session management node may be operative to perform the method according to the above first aspect.

According to a sixth aspect of the disclosure, there is provided a session management node operable in a home network. The session management node may comprise at least one processor and at least one memory. The at least one memory may contain instructions executable by the at least one processor, whereby the session management node may be operative to receive, from another session management node operable in a visiting network, a QoS policy per a roaming agreement between the visiting network and the home network during establishment of a PDU session for a terminal device. The session management node may be further operative to retrieve, from a subscriber management node, subscribed QoS parameters of the terminal device. The session management node may be further operative to obtain a result that is generated based on the QoS policy per the roaming agreement and the subscribed QoS parameters of the terminal device.

In an embodiment of the disclosure, the session management node may be operative to perform the method according to the above second aspect.

According to a seventh aspect of the disclosure, there is provided a policy control node operable in a home network. The policy control node may comprise at least one processor and at least one memory. The at least one memory may contain instructions executable by the at least one processor, whereby the policy control node may be operative to receive, from a session management node operable in the home network, a QoS policy per a roaming agreement between a visiting network and the home network and subscribed QoS parameters of a terminal device. The policy control node may be further operative to determine a result based on the QoS policy per the roaming agreement and the subscribed QoS parameters of the terminal device. The policy control node may be further operative to send the determined result to the session management node.

In an embodiment of the disclosure, the policy control node may be operative to perform the method according to the above third aspect.

According to an eighth aspect of the disclosure, there is provided a session management node operable in a visiting network. The session management node may comprise at least one processor and at least one memory. The at least one memory may contain instructions executable by the at least one processor, whereby the session management node may be operative to obtain, from another session management node operable in a home network, QoS parameters authorized by the home network, during establishment of a PDU session for a terminal device. The session management node may be further operative to determine a result based on a QoS policy per a roaming agreement between the visiting network and the home network and the QoS parameters authorized by the home network.

In an embodiment of the disclosure, the session management node may be operative to perform the method according to the above fourth aspect.

According to a ninth aspect of the disclosure, there is provided a computer program product. The computer program product may comprise instructions which when executed by at least one processor, cause the at least one processor to perform the method according to any of the above first to fourth aspects.

According to a tenth aspect of the disclosure, there is provided a computer readable storage medium. The computer readable storage medium may comprise instructions which when executed by at least one processor, cause the at least one processor to perform the method according to any of the above first to fourth aspects.

According to an eleventh aspect of the disclosure, there is provided a session management node operable in a visiting network. The session management node may comprise a sending module for sending, to another session management node operable in a home network, a QoS policy per a roaming agreement between the visiting network and the home network during establishment of a PDU session for a terminal device.

According to a twelfth aspect of the disclosure, there is provided a session management node operable in a home network. The session management node may comprise a reception module for receiving, from another session management node operable in a visiting network, a QoS policy per a roaming agreement between the visiting network and the home network during establishment of a PDU session for a terminal device. The session management node may further comprise a retrieving module for retrieving, from a subscriber management node, subscribed QoS parameters of the terminal device. The session management node may further comprise an obtaining module for obtaining a result that is generated based on the QoS policy per the roaming agreement and the subscribed QoS parameters of the terminal device.

According to a thirteenth aspect of the disclosure, there is provided a policy control node operable in a home network. The policy control node may comprise a reception module for receiving, from a session management node operable in the home network, a QoS policy per a roaming agreement between a visiting network and the home network and subscribed QoS parameters of a terminal device. The policy control node may further comprise a determination module for determining a result based on the QoS policy per the roaming agreement and the subscribed QoS parameters of the terminal device. The policy control node may further comprise a sending module for sending the determined result to the session management node.

According to a fourteenth aspect of the disclosure, there is provided a session management node operable in a visiting network. The session management node may comprise an obtaining module for obtaining, from another session management node operable in a home network, QoS parameters authorized by the home network, during establishment of a PDU session for a terminal device. The session management node may further comprise a determination module for determining a result based on a QoS policy per a roaming agreement between the visiting network and the home network and the QoS parameters authorized by the home network.

According to some embodiment(s) of the disclosure, the performance of operator networks can be improved.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
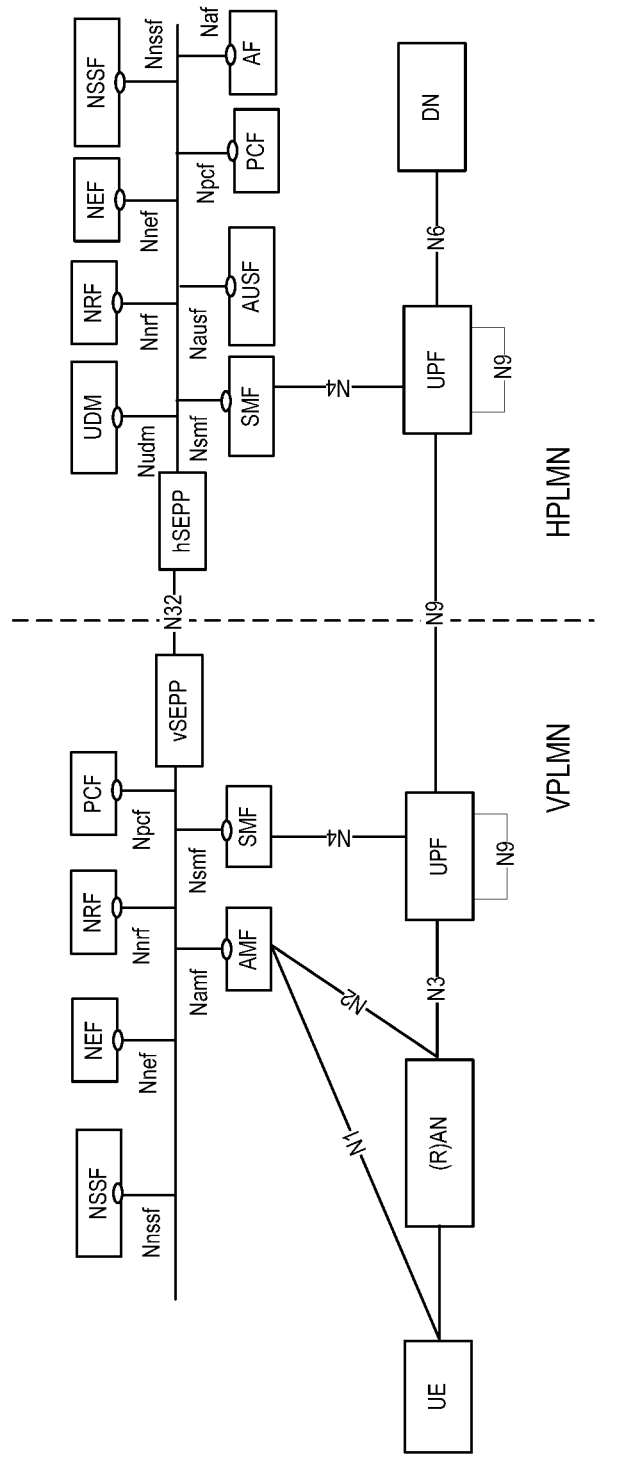
FIG. 1 is a diagram showing a system architecture into which home routed roaming is applicable.
Figure 4:
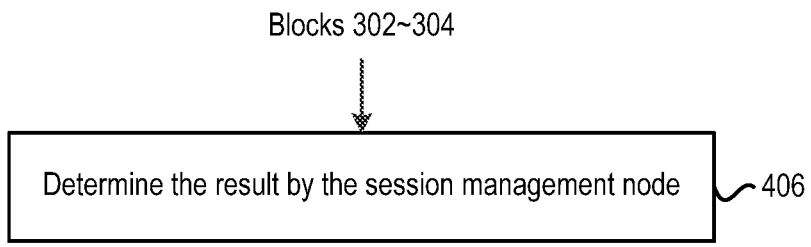
FIG. 4 is a flowchart for explaining the method of FIG. 3.
Figure 5:
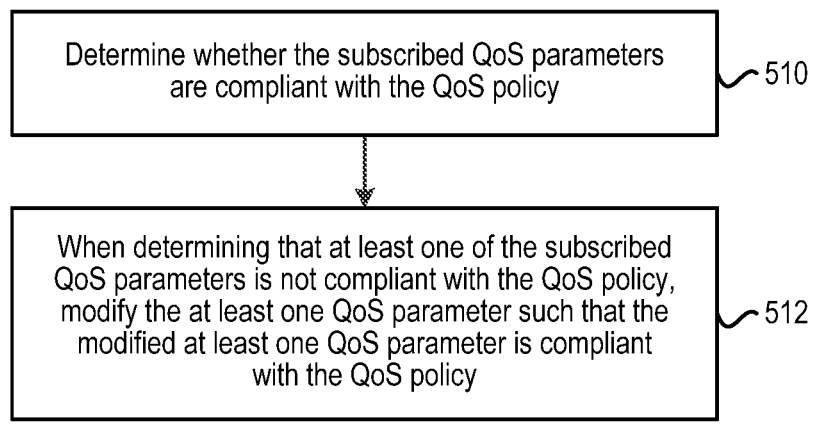
FIG. 5 is a flowchart for explaining the method of FIG. 4.

FIG. 1 is FIG. 4.2.4-3 from 3GPP TS 23.501 v15.3.0, which shows 5G system architecture into which home routed roaming is applicable. As shown, the system architecture comprises a visiting public land mobile network (VPLMN) and a home public land mobile network (HPLMN). The VPLMN may comprise a user equipment (UE), a radio access network (RAN), a user plane function (UPF), an access and mobility management function (AMF), a session management function (SMF), a network slice selection function (NSSF), a network exposure function (NEF), a network repository function (NRF), a policy control function (PCF) and a visiting security edge protection proxy (vSEPP). The HPLMN may comprise a UPF, a data network (DN), an SMF, an authentication server function (AUSF), a PCF, an application function (AF), a unified data management (UDM), an NRF, an NEF, an NSSF and a home security edge protection proxy (hSEPP). The SMF in the VPLMN may also be known as "V-SMF" and the SMF in the HPLMN may also be known as "H-SMF".

According to clause 4.3.2.2.2 of 3GPP TS 23.502 v15.3.0, in case of home-routed roaming scenarios, at PDU session establishment, it is the H-SMF that retrieves the subscription data including subscribed QoS from the UDM. However, according to clause 7.2 of global system for mobile communications (GSM) association (GSMA) IR.88 v16.0.0 long term evolution (LTE) and evolved packet core (EPC) Roaming Guidelines, it is the visiting network that shall control the QoS in order to protect its network against unwanted resource use.

Therefore, for PDU session establishment, there is no possibility for the visiting network to apply the local policy to adjust QoS parameters (e.g. 5QI, ARP, and session AMBR) based on roaming agreement. The only possibility is for the VPLMN to check the request from SMF in HPLMN and either accept or reject the request. As a result, the HPLMN may not be able to be compliant with the roaming agreement due to lack of the necessary input. Consequently, the VPLMN may reject the PDU establishment or initiate the PDU session deletion due to the violation of the roaming agreement.

The present disclosure proposes improved solutions for facilitating roaming of terminal device. Hereinafter, the solutions will be described in detail with reference to FIGS. 2-17.

Figure 2:
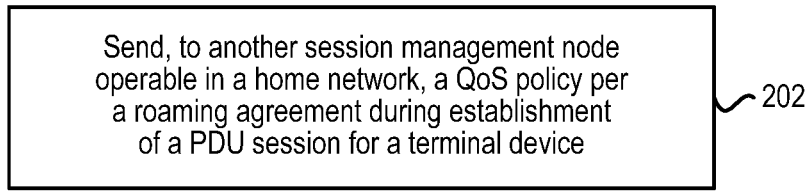
FIG. 2 is a flowchart illustrating a method implemented at a session management node according to an embodiment of the disclosure.

FIG. 2 is a flowchart illustrating a method implemented at a session management node operable in a visiting network according to an embodiment of the disclosure. The session management node may be an SMF or any other entity having similar functionality. The visiting network is a term defined relative to a home network. The home network refers to a network which a terminal device is registered to. Once the terminal device travels to another network, other than the home network, this is referred to as a roaming state. The visiting network is the network serving the terminal device in the roaming state. The method of FIG. 2 may be applicable to a home routed roaming scenario.

The terminal device mentioned above may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

At block 202, the session management node operable in the visiting network sends, to another session management node operable in a home network, a QoS policy per a roaming agreement between the visiting network and the home network during establishment of a PDU session for a terminal device. For example, the terminal device may be registered in the home network and roaming in the visiting network in home routed roaming manner. The QoS policy per the roaming agreement may be locally configured when the session management node is deployed. The QoS policy per the roaming agreement may comprise one or more QoS parameters allowed in the visiting network such as allowed QoS profile and allowed session-AMBR. The QoS policy per the roaming agreement may be sent in a request for creating a PDU session for the terminal device. As an exemplary example, the request may be an Nsmf_PDUSession_Create Request message. Since the visiting network informs the home network of the QoS policy based on the roaming agreement, it is possible for the home network to apply the QoS policy based on the roaming agreement to the roamer(s), which may reduce the amount of rejected PDU session establishment procedures and improve the key performance indicators (KPIs) of operator networks.

Figure 3:
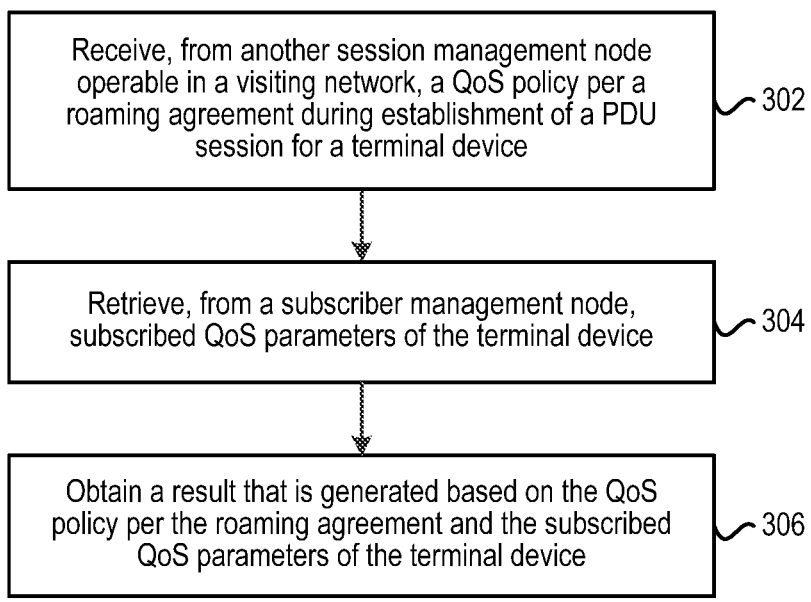
FIG. 3 is a flowchart illustrating a method implemented at a session management node according to an embodiment of the disclosure.

FIG. 3 is a flowchart illustrating a method implemented at a session management node operable in a home network according to an embodiment of the disclosure. At block 302, the session management node receives, from another session management node operable in a visiting network, a QoS policy per a roaming agreement between the visiting network and the home network during establishment of a PDU session for a terminal device. Block 302 corresponds to block 202 and its details are omitted here. At block 304, the session management node retrieves, from a subscriber management node, subscribed QoS parameters of the terminal device. The subscriber management node may be a UDM or any other entity having similar functionality. As mentioned in background section, the subscribed QoS parameters are part of the subscription data of the terminal device and may be retrieved by the session management node (e.g. SMF) from the subscriber management node (e.g. UDM).

At block 306, the session management node obtains a result that is generated based on the QoS policy per the roaming agreement and the subscribed QoS parameters of the terminal device. In other word, the result is generated by applying the QoS policy per the roaming agreement to the subscribed QoS parameters of the terminal device. Thus, the result indicates whether all of the subscribed QoS parameters violate the QoS policy and modified QoS parameter(s) in case the QoS policy is violated. As a first option, the session management node may determine the result by itself, as shown in block 406 of FIG. 4. For example, block 406 may be implemented as block 510-512 of FIG. 5. At block 510, the session management node determines whether the subscribed QoS parameters are compliant with the QoS policy. For example, the session management node may determine, for each QoS parameter of the subscribed QoS parameters, whether the QoS indicated by the QoS parameter is higher than that indicated by the corresponding QoS parameter allowed in the visiting network (included in the QoS policy per the roaming agreement). If the determination result is positive (i.e. the QoS indicated by the subscribed QoS parameter is higher than that indicated by the corresponding allowed QoS parameter in the visiting network), then the QoS parameter may be determined to be not compliant with the QoS policy.

At block 512, when determining that at least one QoS parameter of the subscribed QoS parameters is not compliant with the QoS policy, the session management node modifies the at least one QoS parameter such that the modified at least one QoS parameter is compliant with the QoS policy. For example, if the QoS indicated by the subscribed QoS parameter is higher than that indicated by the corresponding allowed QoS parameter in the visiting network, a value indicating a QoS lower than that indicated by the corresponding allowed QoS parameter may be determined as the modified QoS parameter.

Figure 6:
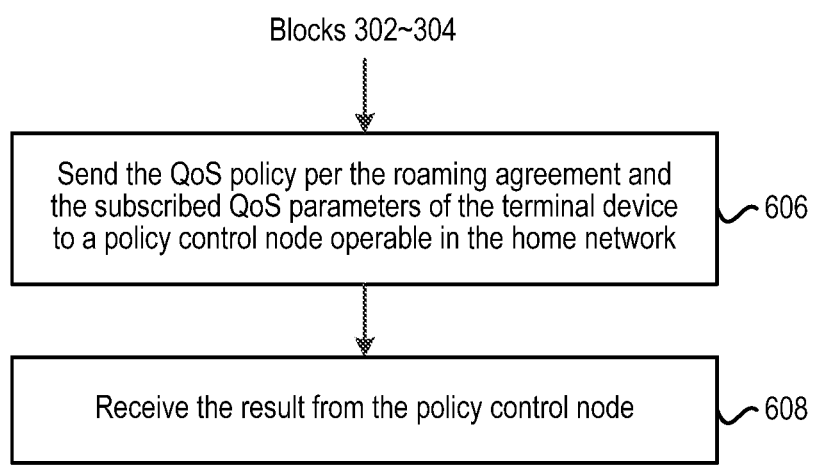
FIG. 6 is a flowchart for explaining the method of FIG. 3.

As a second option, block 306 may be implemented as blocks 606-608 of FIG. 6. At block 606, the session management node sends the QoS policy per the roaming agreement and the subscribed QoS parameters of the terminal device to a policy control node operable in the home network. The policy control node may be a PCF or any other entity having similar functionality. In this way, the result may be determined by the policy control node. At block 608, the session management node receives the result from the policy control node.

In the above first and second options, since the home network applies the QoS policy based on the roaming agreement to the roamer(s), the amount of rejected PDU session establishment procedures may be reduced and the KPIs of operator networks may be improved.

Figure 7:
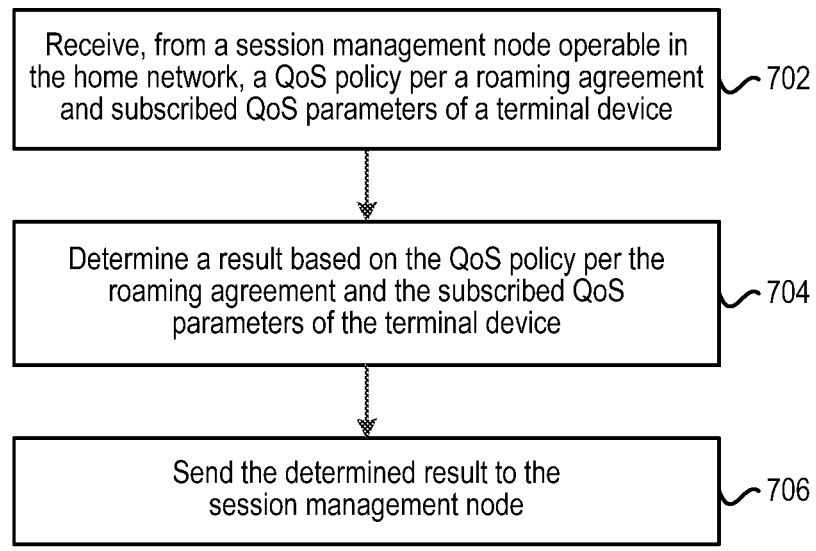
FIG. 7 is a flowchart illustrating a method implemented at a policy control node according to an embodiment of the disclosure.

FIG. 7 is a flowchart illustrating a method implemented at a policy control node operable in a home network according to an embodiment of the disclosure. At block 702, the policy control node receives, from a session management node operable in the home network, a QoS policy per a roaming agreement between a visiting network and the home network and subscribed QoS parameters of a terminal device. Block 702 corresponds to block 606 and its details are omitted here. At block 704, the policy control node determines a result based on the QoS policy per the roaming agreement and the subscribed QoS parameters of the terminal device. Block 704 may be implemented as blocks 510-512 of FIG. 5 and its details are omitted here. At block 706, the policy control node sends the determined result to the session management node.

Figure 8:
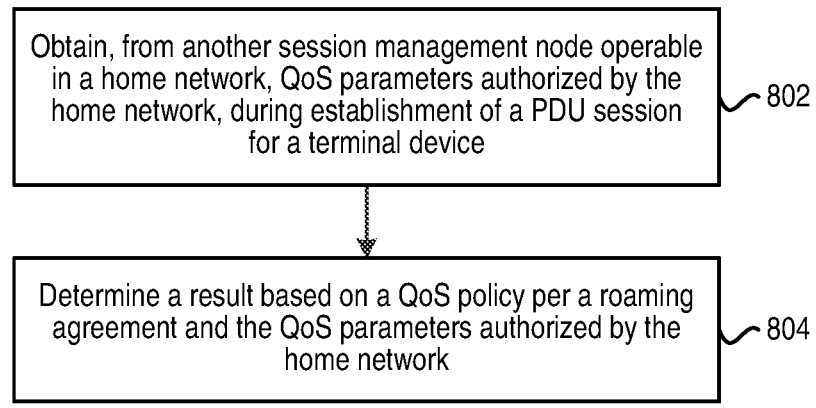
FIG. 8 is a flowchart illustrating a method implemented at a session management node according to an embodiment of the disclosure.
Figure 9:
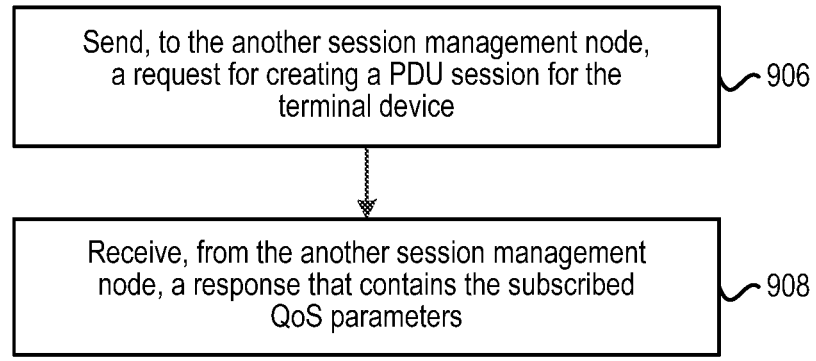
FIG. 9 is a flowchart for explaining the method of FIG. 8.
Figure 10:
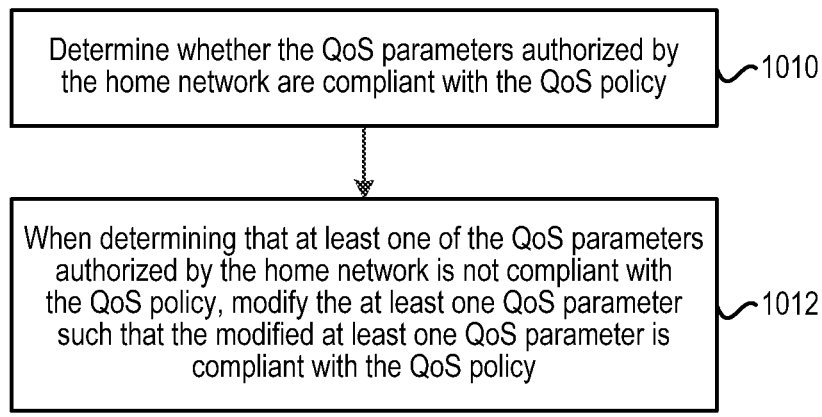
FIG. 10 is a flowchart for explaining the method of FIG. 8.

FIG. 8 is a flowchart illustrating a method implemented at a session management node operable in a visiting network according to an embodiment of the disclosure. At block 802, the session management node obtains, from another session management node operable in a home network, QoS parameters authorized by the home network, during establishment of a PDU session for a terminal device. For example, block 802 may be implemented as blocks 906-908 of FIG. 9. At block 906, the session management node sends, to the another session management node, a request for creating a PDU session for the terminal device. As an exemplary example, the request may be a Nsmf_PDUSession_Create Request message. At block 908, the session management node receives, from the another session management node, a response that contains the QoS parameters authorized by the home network. As an exemplary example, the response may be a Nsmf_PDUSession_Create Response message.

At block 804, the session management node determines a result based on a QoS policy per a roaming agreement between the visiting network and the home network and the QoS parameters authorized by the home network. For example, block 804 may be implemented as blocks 1010-1012 of FIG. 10. At block 1010, the session management node determines whether the QoS parameters authorized by the home network are compliant with the QoS policy. Block 1010 may be implemented in a way similar to block 510 of FIG. 5. At block 1012, when determining that at least one QoS parameter of the QoS parameters authorized by the home network is not compliant with the QoS policy, the session management node modifies the at least one QoS parameter such that the modified at least one QoS parameter is compliant with the QoS policy. Block 1012 may be implemented in a way similar to block 512 of FIG. 5. Since the visiting network applies the QoS policy based on the roaming agreement to the roamer(s), the amount of rejected PDU session establishment procedures may be reduced and the KPIs of operator networks may be improved.

Figure 11:
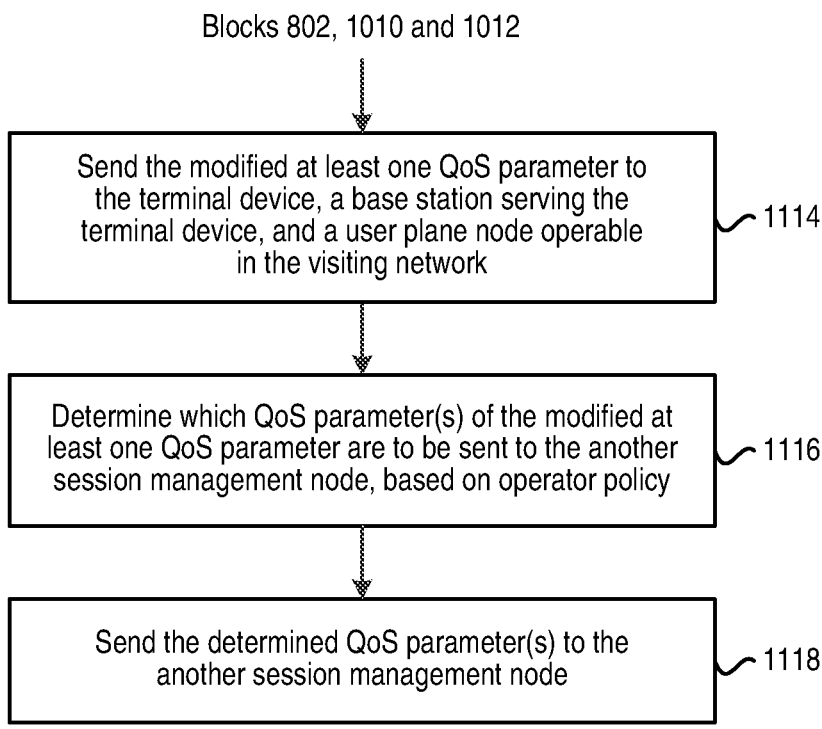
FIG. 11 is a flowchart illustrating a method implemented at a session management node according to an embodiment of the disclosure.

FIG. 11 is a flowchart illustrating a method implemented at a session management node operable in a visiting network according to an embodiment of the disclosure. As shown, the method comprises blocks 802, 1010, 1012 and 1114-1118.

Blocks 802, 1010 and 1012 have been described above and their details are omitted here. At block 1114, the session management node sends the modified at least one QoS parameter to the terminal device, a base station serving the terminal device, and a user plane node operable in the visiting network. The user plane node may be a UPF or any other entity having similar functionality.

At block 1116, the session management node determines which QoS parameter(s) of the modified at least one QoS parameter are to be sent to the another session management node, based on the QoS policy per the roaming agreement. As an option, all of the modified QoS parameters may be determined to be sent. As another option, only certain types of modified QoS parameters (e.g. 5QI and ARP) may be determined to be sent. At block 1118, the session management node sends the determined QoS parameter(s) to the another session management node. It should be noted that two blocks shown in succession may, in fact, be executed substantially concurrently, or the blocks may sometimes be executed in the reverse order, depending upon the functionality involved.

Figure 12:
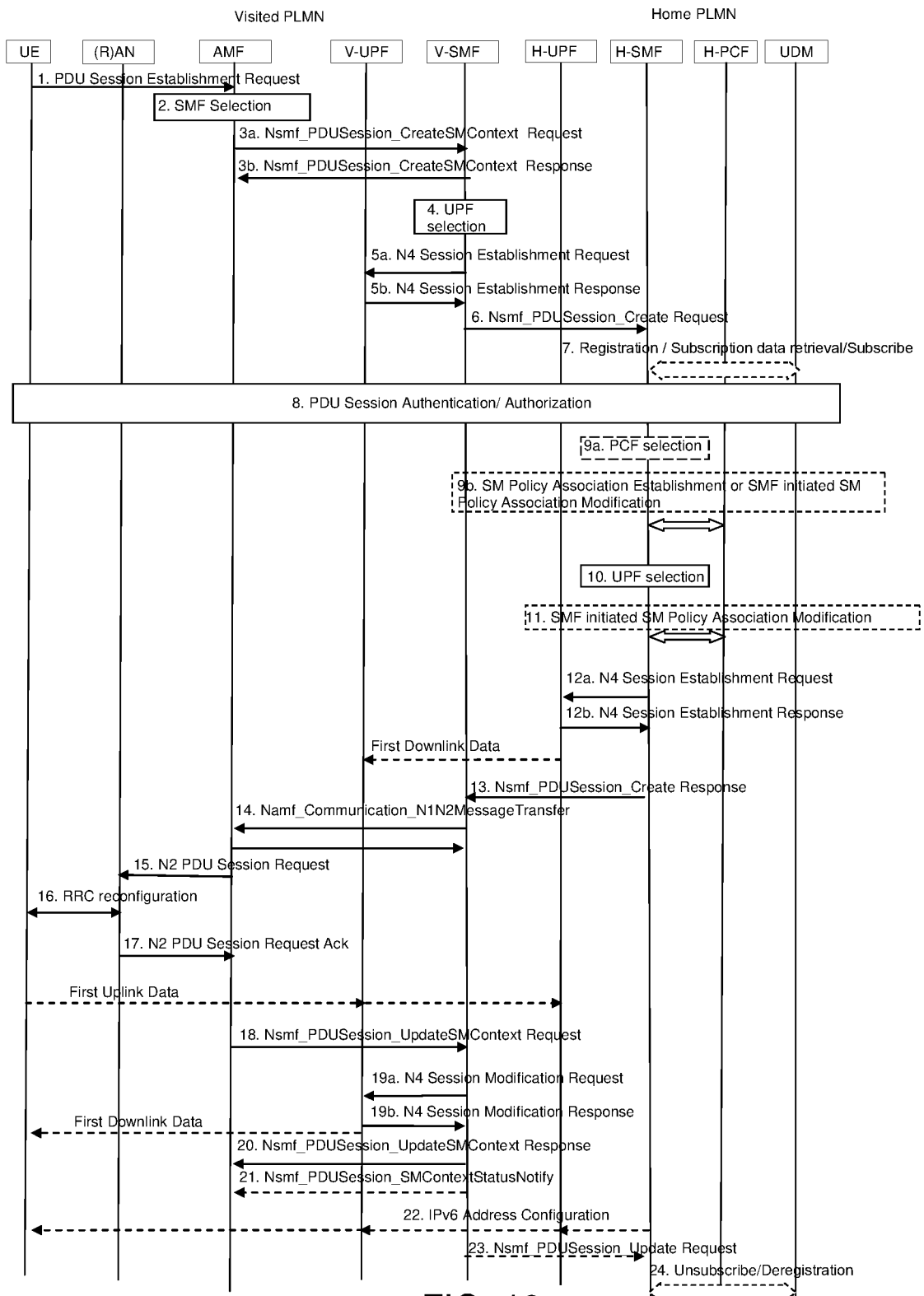
FIG. 12 is a flowchart illustrating an existing process for PDU session establishment.

FIG. 12 is a flowchart illustrating an existing process for PDU session establishment in home routed roaming scenarios. It is FIG. 4.3.2.2.2-1 of 3GPP TS 23.502 v15.3.0. At step 1, the UE sends a PDU Session Establishment Request to the RAN. At step 2, the AMF performs SMF selection. At step 3a, the AMF sends an Nsmf_PDUSession_CreateSM-Context Request to the V-SMF. At step 3b, the V-SMF replies to the AMF with an Nsmf_PDUSession_CreateSM-Context Response. At step 4, the V-SMF performs UPF selection. At block 5a, the V-SMF sends an N4 Session Establishment Request to the V-UPF. At block 5b, the V-UPF replies to the V-SMF with an N4 Session Establishment Response.

At step 6, the V-SMF sends an Nsmf_PDUSession_Create Request to the H-SMF. At step 7, Registration/Subscription data retrieval/Subscription for Updates is performed. At step 8, PDU Session Authentication/Authorization is performed. At step 9a, the H-SMF performs PCF selection. At step 9b, SM Policy Association Establishment or SMF initiated SM Policy Association Modification is performed. At step 10, the H-SMF performs UPF selection. At step 11, SMF initiated SM Policy Association Modification is performed. At step 12a, the H-SMF sends an N4 Session Establishment Request to the H-UPF. At step 12b, the H-UPF replies to the H-SMF with an N4 Session Establishment Response. At step 13, the H-SMF replies to the V-SMF with an Nsmf_PDUSession_Create Response.

At step 14, Namf_Communication_N1N2MessageTransfer is performed. At step 15, the AMF sends an N2 PDU Session Request to the RAN. At step 16, RRC configuration is performed. At step 17, the RAN replies to the SMF with an N2 PDU Session Request Ack. At step 18, the AMF sends an Nsmf_PDUSession_UpdateSMContext Request to the V-SMF. At step 19a, the V-SMF sends an N4 Session Modification Request to the V-UPF. At step 19b, the V-UPF replies to the V-SMF with an N4 Session Modification Response. At step 20, the V-SMF replies to the AMF with an Nsmf_PDUSession_UpdateSMContext Response. At step 21, the V-SMF sends an Nsmf_PDUSession_SMContextStatusNotify to the AMF. At step 22, IPv6 Address Configuration is performed. At step 23, the V-SMF sends an Nsmf_PDUSession_Update Request to the H-SMF. At step 24, Unsubscription/Deregistration is performed. The details of the above steps can be obtained from clause 4.3.2.2.2 of 3GPP TS 23.502 v15.3.0, which is incorporated here by reference in its entirety.

As a first exemplary solution of the present disclosure (corresponding to FIGS. 2-7), the V-SMF sends its local (operator) policy (e.g. allowed QoS profile, allowed Session-AMBR) directly to the H-SMF during PDU Session establishment (e.g. when the V-SMF first contacts the H-SMF). After receiving the local policy from the V-SMF, the H-SMF retrieves the subscription data from the UDM and takes the visiting network's policy into consideration by applying the visiting network's policy when authorizing the QoS parameters. Optionally, the PCF may take the visiting network's policy into consideration when authorizing the QoS parameters.

Thus, for the first exemplary solution, at the above step 6, additional parameters for the visiting network's local policy (e.g. one or more QoS parameters allowed in the visiting network such as session-AMBR) needs to be included in the Nsmf_PDUSession_Create Request. In addition, at steps 7-12, the H-SMF may check the subscription data and the QoS parameters provided by the visiting network to ensure the PDU session setup is established according to the roaming agreement. Alternatively, the H-SMF may provide both the subscribed QoS parameters (e.g. subscribed session-AMBR) and QoS parameters received from the V-SMF to the H-PCF. The H-PCF may determine new parameter values (modified QoS parameters) based on the received values and provide the new parameters to the H-SMF.

As a second exemplary solution of the present disclosure (corresponding to FIGS. 8-11), during PDU session establishment, the V-SMF checks the QoS parameters returned from the H-SMF against the local policy. If the HPLMN provided QoS parameters violate the local policy (that is, are not according to or compliant with the roaming agreement), the V-SMF initiates a QoS modification. In addition, the V-SMF may initiate QoS modification to the H-SMF to ensure the alignment with H-PLMN, by updating the H-SMF with the QoS parameters that are acceptable based on the roaming agreement. The H-SMF (and optionally H-PCF) may accept the V-SMF provided QoS parameters.

Thus, for the second exemplary solution, at the above step 13, if any of the QoS parameters provided by the H-SMF are not compliant with the roaming agreement, the V-SMF modifies the QoS parameters (e.g. Session-AMBR), and provides the modified parameters to the UE, the NG-RAN and UPF. In addition, at the above step 23, if any of the QoS parameters is modified at step 13, the V-SMF may include all or some of the modified QoS parameters in the Nsmf_PDUSession_Update Request. The H-SMF may apply the modified QoS parameters to the UPF and the H-SMF may also need to update the PCF. Note that the V-SMF may, based on local policy, decide which modified QoS parameter(s) shall be notified back to the H-SMF.

Figure 13:
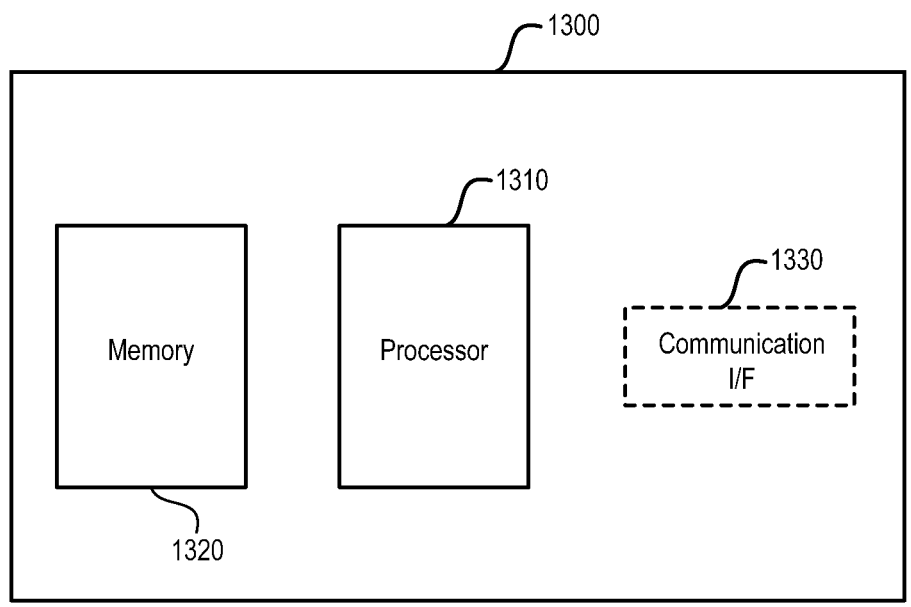
FIG. 13 is a block diagram showing an apparatus suitable for use in practicing some embodiments of the disclosure.

FIG. 13 is a block diagram showing an apparatus suitable for use in practicing some embodiments of the disclosure. For example, any one of the session management node and the policy control node described above may be implemented through the apparatus 1300. As shown, the apparatus 1300 may include a processor 1310, a memory 1320 that stores a program, and optionally a communication interface 1330 for communicating data with other external devices through wired and/or wireless communication.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memories, magnetic memory devices and systems, optical memory devices and systems, fixed memories and removable memories. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
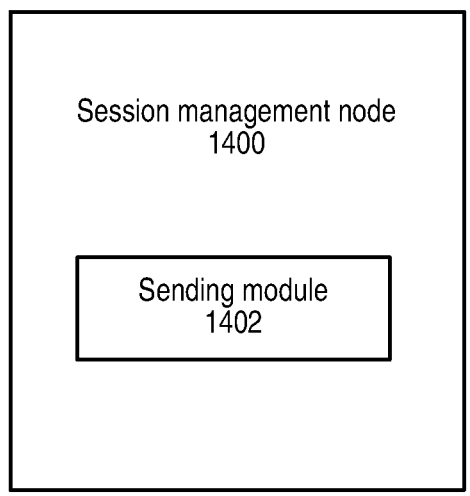
FIG. 14 is a block diagram showing a session management node according to an embodiment of the disclosure.

FIG. 14 is a block diagram showing a session management node operable in a visiting network according to an embodiment of the disclosure. As shown, the session management node 1400 comprises a sending module 1402. The sending module 1402 may be configured to send, to another session management node operable in a home network, a QoS policy per a roaming agreement between the visiting network and the home network during establishment of a PDU session for a terminal device, as described above with respect to block 202.

Figure 15:
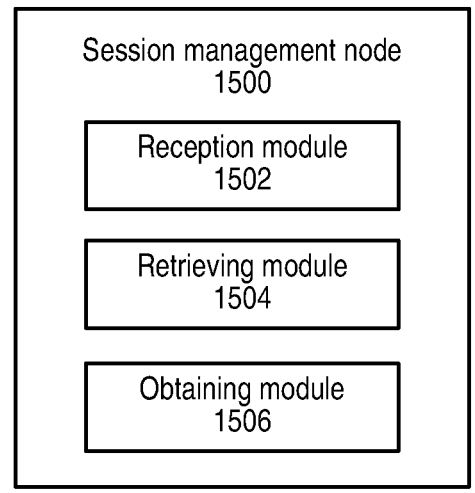
FIG. 15 is a block diagram showing a session management node according to an embodiment of the disclosure.

FIG. 15 is a block diagram showing a session management node operable in a home network according to an embodiment of the disclosure. As shown, the session management node 1500 comprises a reception module 1502, a retrieving module 1504 and an obtaining module 1506. The reception module 1502 may be configured to receive, from another session management node operable in a visiting network, a QoS policy per a roaming agreement between the visiting network and the home network during establishment of a PDU session for a terminal device, as described above with respect to block 302. The retrieving module 1504 may be configured to retrieve, from a subscriber management node, subscribed QoS parameters of the terminal device, as described above with respect to block 304. The obtaining module 1506 may be configured to obtain a result that is generated based on the QoS policy per the roaming agreement and the subscribed QoS parameters of the terminal device, as described above with respect to block 306.

Figure 16:
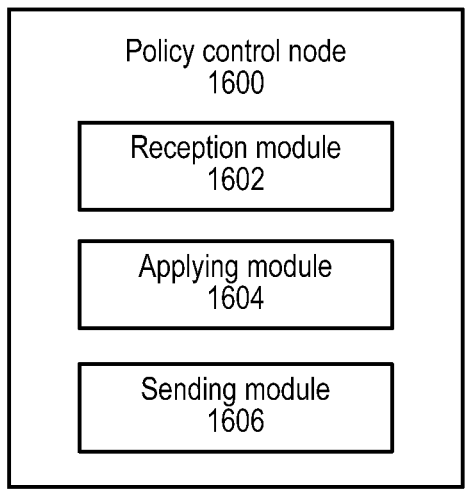
FIG. 16 is a block diagram showing a policy control node according to an embodiment of the disclosure.

FIG. 16 is a block diagram showing a policy control node operable in a home network according to an embodiment of the disclosure. As shown, the policy control node 1600 comprises a reception module 1602, a determination module 1604 and a sending module 1606. The reception module 1602 may be configured to receive, from a session management node operable in the home network, a QoS policy per a roaming agreement between a visiting network and the home network and subscribed QoS parameters of a terminal device, as described above with respect to block 702. The determination module 1604 may be configured to determine a result based on the QoS policy per the roaming agreement and the subscribed QoS parameters of the terminal device, as described above with respect to block 704. The sending module 1606 may be configured to send the determined result to the session management node, as described above with respect to block 706.

Figure 17:
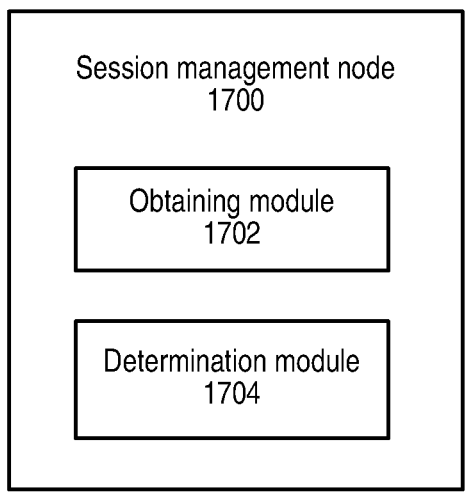
FIG. 17 is a block diagram showing a session management node according to an embodiment of the disclosure.

FIG. 17 is a block diagram showing a session management node operable in a visiting network according to an embodiment of the disclosure. As shown, the session management node 1700 comprises an obtaining module 1702 and a determination module 1704. The obtaining module 1702 may be configured to obtain, from another session management node operable in a home network, QoS parameters authorized by the home network, during establishment of a PDU session for a terminal device, as described above with respect to block 802. The determination module 1704 may be configured to determine a result based on a QoS policy per a roaming agreement between the visiting network and the home network and the QoS parameters authorized by the home network, as described above with respect to block 804. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a session management node operable in a home network, the method comprising:
   receiving, from another session management node operable in a visiting network, a quality of service, QoS, policy per a roaming agreement between the visiting network and the home network during establishment of a protocol data unit, PDU, session for a terminal device;
   retrieving, from a subscriber management node, subscribed QoS parameters of the terminal device;
   obtaining a result that is generated based on the QoS policy per the roaming agreement and the subscribed QoS parameters of the terminal device, obtaining the result comprising:
      determining the result by the session management node;
   determining whether the subscribed QoS parameters are compliant with the QoS policy; and
   when determining that at least one QoS parameter of the subscribed QoS parameters is not compliant with the QoS policy, modifying the at least one QoS parameter such that the modified at least one QoS parameter is compliant with the QoS policy.

2. The method according to claim 1, wherein obtaining the result comprises:
   sending the QoS policy per the roaming agreement and the subscribed QoS parameters of the terminal device to a policy control node operable in the home network; and
   receiving the result from the policy control node.

3. The method according to claim 1, wherein the QoS policy per the roaming agreement comprises one or more QoS parameters allowed in the visiting network.

4. The method according to claim 1, wherein the QoS policy per the roaming agreement is received in a request for creating a PDU session for the terminal device.

5. A method implemented at a session management node operable in a visiting network, the method comprising:
obtaining, from another session management node operable in a home network, quality of service, QoS, parameters authorized by the home network, during establishment of a protocol data unit, PDU, session for a terminal device;
determining a result based on a QoS policy per a roaming agreement between the visiting network and the home network and the QoS parameters authorized by the home network, determining the result comprising:
determining whether the QoS parameters authorized by the home network are compliant with the QoS policy; and
when determining that at least one QoS parameter of the QoS parameters authorized by the home network is not compliant with the QoS policy, modifying the at least one QoS parameter such that the modified at least one QoS parameter is compliant with the QoS policy.

6. The method according to claim 5, further comprising:
sending the modified at least one QoS parameter to the terminal device, a base station serving the terminal device, and a user plane node operable in the visiting network.

7. The method according to claim 5, further comprising:
determining which QoS parameter(s) of the modified at least one QoS parameter are to be sent to the another session management node, based on the QoS policy per the roaming agreement; and
sending the determined QoS parameter(s) to the another session management node.

8. The method according to claim 7, wherein the determined QoS parameter(s) are sent in a request for updating the PDU session for the terminal device.

9. The method according to claim 5, wherein obtaining the QoS parameters authorized by the home network comprises:
sending, to the another session management node, a request for creating a PDU session for the terminal device; and
receiving, from the another session management node, a response that contains the QoS parameters authorized by the home network.

10. A session management node operable in a home network, the session management node comprising:
at least one processor; and
at least one memory, the at least one memory containing instructions executable by the at least one processor, whereby the session management node is operative to:
receive, from another session management node operable in a visiting network, a quality of service, QoS, policy per a roaming agreement between the visiting network and the home network during establishment of a protocol data unit, PDU, session for a terminal device;
retrieve, from a subscriber management node, subscribed QoS parameters of the terminal device; and
obtain a result that is generated based on the QoS policy per the roaming agreement and the subscribed QoS parameters of the terminal device, obtaining the result comprising:
determining the result by the session management node;
determine whether the subscribed QoS parameters are compliant with the QoS policy; and
when it is determined that at least one QoS parameter of the subscribed QoS parameters is not compliant with the QoS policy, modifying the at least one QoS parameter such that the modified at least one QoS parameter is compliant with the QoS policy.

11. The session management node according to claim 10, wherein the session management node operative to obtain the result comprises the session management node operative to determine the result.

* * * * *